US012596874B2

(12) United States Patent
Vaidyanathan

(10) Patent No.: US 12,596,874 B2
(45) Date of Patent: Apr. 7, 2026

(54) OPERATION ERROR DETECTION

(71) Applicant: SAP SE, Walldorf (DE)

(72) Inventor: Mahesh Vaidyanathan, Bangalore (IN)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 18/366,891

(22) Filed: Aug. 8, 2023

(65) Prior Publication Data

US 2025/0053740 A1 Feb. 13, 2025

(51) Int. Cl.
G06F 40/284 (2020.01)

(52) U.S. Cl.
CPC .................................. G06F 40/284 (2020.01)

(58) Field of Classification Search
CPC ...................................................... G06F 40/284
See application file for complete search history.

(56) References Cited

U.S. PATENT DOCUMENTS

| | | | |
|---|---|---|---|
| 2012/0134576 A1* | 5/2012 | Sharma | G06V 10/507 |
| | | | 382/206 |
| 2019/0139147 A1* | 5/2019 | Mittal | G06N 20/00 |
| 2021/0117678 A1* | 4/2021 | Farre Guiu | G06V 20/20 |

* cited by examiner

*Primary Examiner* — Richemond Dorvil
*Assistant Examiner* — Ethan Daniel Kim
(74) *Attorney, Agent, or Firm* — Buckley, Maschoff & Talwalkar LLP

(57) ABSTRACT

Systems and methods include acquisition of operation data associated with a plurality of operations, generate a set of feature values for each operation based on associated operation data, determine a first set of the operations associated with an error and, for each operation of the first set, automatically determine a rejection reason based on operation data associated with the operation, determine a rejection label associated with the rejection reason, and associate the rejection label with the set of feature values generated for the operation.

15 Claims, 10 Drawing Sheets

400

| Invoice No. | Buyer | Buyer Address | Supplier | Supplier Address | Material1 | Quantity1 | ... | Attachments | Rejection1 | Rejection2 | ... |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |

| Payload_ID | Attachment_Name | Timesheet_Approval | Timesheet_Needed | Invoice_Attachment |
|---|---|---|---|---|
| | | | | |
| | | | | |
| | | | | |
| | | | | |
| | | | | |

Figure 10:
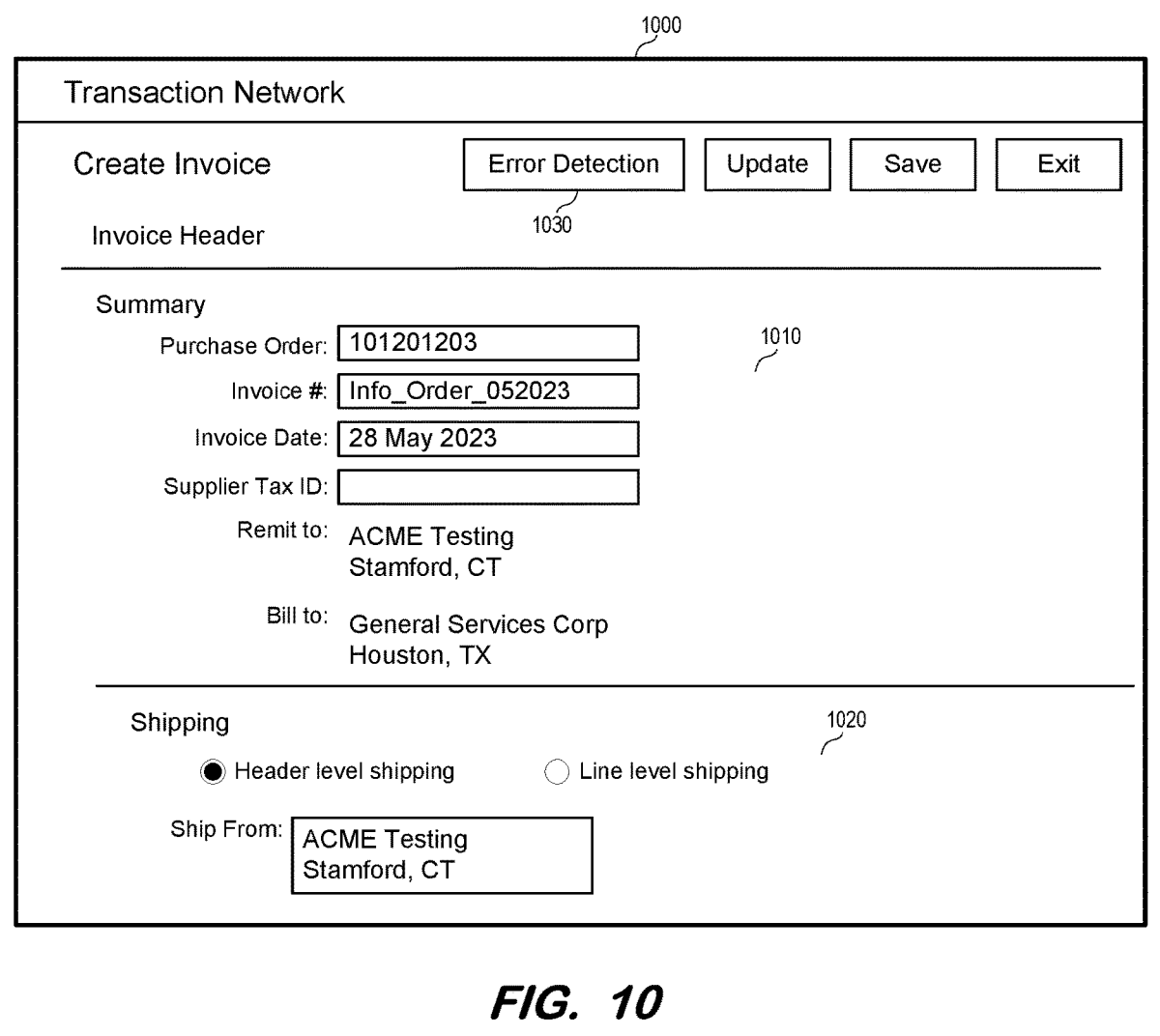

Transaction Network

| Create Invoice | Error Detection | Update | Save | Exit |

Invoice Header                              1030

Summary

Purchase Order: | 101201203 |                    1010

Invoice #: | Info_Order_052023 |

Invoice Date: | 28 May 2023 |

Supplier Tax ID: | |

Remit to:   ACME Testing
Stamford, CT

Bill to:   General Services Corp
Houston, TX

Shipping                                        1020

● Header level shipping     ○ Line level shipping

Ship From: | ACME Testing
Stamford, CT |

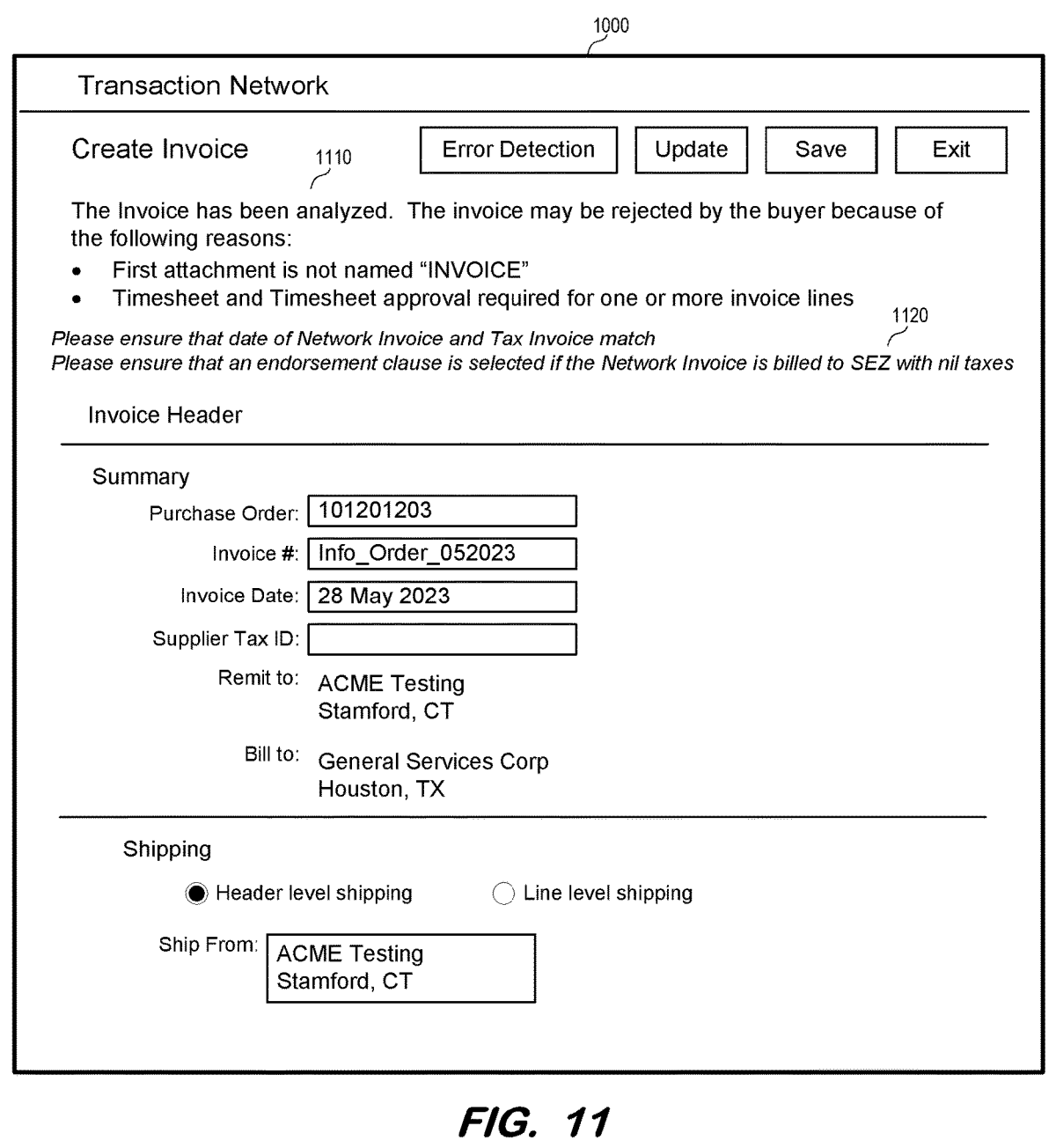

Transaction Network

Create Invoice    1110    | Error Detection | Update | Save | Exit |

The Invoice has been analyzed.  The invoice may be rejected by the buyer because of the following reasons:
- First attachment is not named "INVOICE"
- Timesheet and Timesheet approval required for one or more invoice lines

1120

*Please ensure that date of Network Invoice and Tax Invoice match*
*Please ensure that an endorsement clause is selected if the Network Invoice is billed to SEZ with nil taxes*

Invoice Header

Summary

Purchase Order: | 101201203 |

Invoice #: | Info_Order_052023 |

Invoice Date: | 28 May 2023 |

Supplier Tax ID: | |

Remit to:  ACME Testing
Stamford, CT

Bill to:  General Services Corp
Houston, TX

Shipping

⦿ Header level shipping        ◯ Line level shipping

Ship From: | ACME Testing
Stamford, CT |

FIG. 11

OPERATION ERROR DETECTION

BACKGROUND

Modern organizations use computing systems for a multitude of tasks. Comprehensive enterprise resource planning systems may be used to track, manage and troubleshoot most functional units of an organization, including but not limited to manufacturing and logistics, customer resource management, supply chain management, human resource management, and finance. Systems of one organization may interact with systems of another organization, directly or through an intermediary, to streamline transactions between the organizations.

For example, a supplier organization may submit invoices to a buyer organization electronically. The invoices may be generated by the supplier organization in a computing system of the suppler organization or in a centralized transaction network which connects supplier organizations and buyer organizations. Invoices generated in this manner are often rejected. The invoices may be rejected by a buyer organization due to rules configured in a computing system of the buyer organization and/or by a centralized transaction network due to rules configured in the transaction network.

Invoice rejection rates have been increasing and are estimated to be 10% of the total number of submitted invoices. The rejection rate of invoices submitted to some buyer organizations approaches 40%. Rejected invoices must be corrected, which consumes valuable manual and computing resources. Moreover, the correction and resubmission of invoices causes delays in receipt of the corrected invoices by the buyer organizations and in the receipt of the corresponding payments by the supplier organizations. These delayed payments can adversely affect cash flow and harm operations.

Systems are desired to efficiently reduce invoice rejection rates in electronic invoice submission systems.

BRIEF DESCRIPTION OF THE DRAWINGS

FIG. 4 is a tabular representation of transaction data associated with each of a plurality of transactions according to some embodiments.

FIG. 5 is a tabular representation of feature values generated based on transaction data associated with each of a plurality of transactions according to some embodiments.

FIG. 10 illustrates an interface for invoice creation and submission according to some embodiments.

FIG. 11 illustrates an interface for invoice creation and submission including error detection results according to some embodiments.

DETAILED DESCRIPTION

The following description is provided to enable any person in the art to make and use the described embodiments. Various modifications, however, will be readily-apparent to those in the art.

Embodiments may provide automatic detection of errors in a proposed transaction, such as but not limited to submission of an invoice. Automatic detection is provided by a classification model which is trained based on historical data associated with successful and failed operations, or transactions. The training data is labeled automatically using natural language processing and/or machine-learning models.

In some embodiments, operation/transaction data associated with a plurality of operations/transactions is acquired. A rejection reason is automatically determined for each transaction based on the transaction data and a rejection label associated with each rejection reason is also determined. To generate the above-mentioned training data, the rejection label determined for each transaction is associated with a set of feature values generated based on the transaction data of the transaction.

Some embodiments expose the functionality described herein via a Web service endpoint. Accordingly, disparate systems can use the functionality to detect potential errors prior to submitting an invoice to a business-to-business transaction network.

Figure 1:
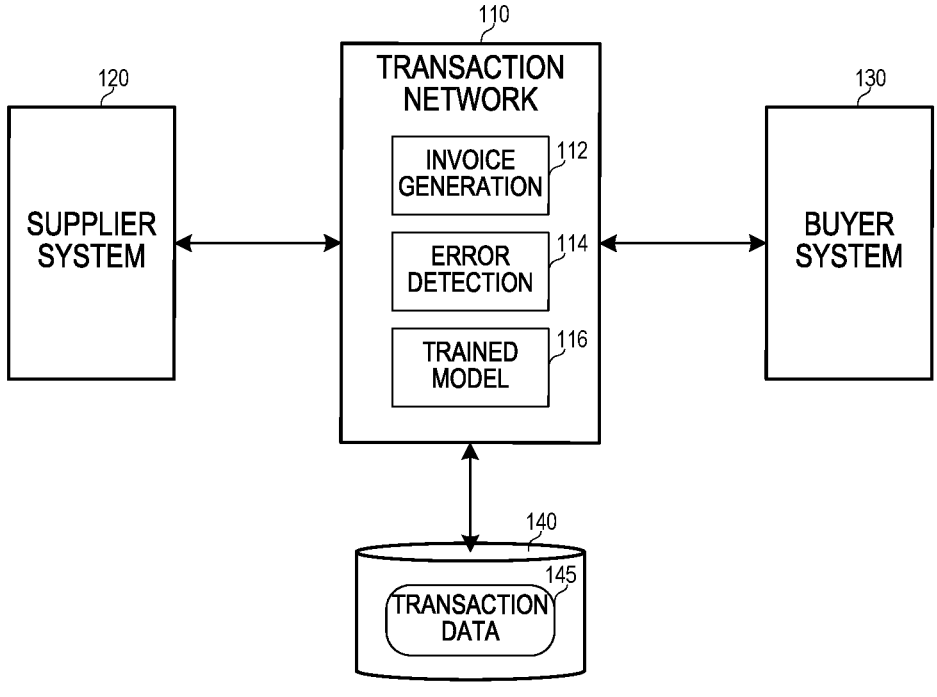
FIG. 1 is a block diagram illustrating operation of a transaction network according to some embodiments.

FIG. 1 is a block diagram illustrating operation of a business-to-business transaction network according to some embodiments. The illustrated components may be implemented using any suitable combination of computing hardware and/or software that is or becomes known. In some embodiments, two or more components are implemented by a single computing device. Two or more components of FIG. 1 may be co-located. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Transaction network 110 may facilitate inter-organization transactions according to some embodiments. Such transactions may include but are not limited to auctions and associated bidding, supply contracts, purchasing, invoice submission, payments and approvals. Transaction network 110 may be provided by one organization, with other organizations subscribing to desired services of transaction network. Users of subscribing organizations may operate computing systems to log on to transaction network 110. In some embodiments, a user accesses a Web page hosted by transaction network 110 to log in thereto and to interact therewith. Although depicted as a single entity, transaction network 110 may comprise many disparate computing systems deployed in a distributed environment providing low latency, resiliency and backup to users located in one or more availability zones and geographic regions as is known in the art.

Supplier system 120 may comprise a computing system operated by a supplier organization, but embodiments are not limited thereto. Supplier system 120 may comprise a desktop computing system operating a Web browser to access functionality of transaction network 110 as described above. Supplier system 120 may comprise a system such as an enterprise resource planning system used by a supplier organization. In such a case, users may log on to supplier system 120 via their respective computing devices, and supplier system 120 may interact with transaction network 110 as needed in response to user requests.

Similarly, buyer system 130 may comprise a computing system operated by a buyer organization, such as a desktop computing system operating a Web browser to access functionality of transaction network 110. Buyer system 130 may also comprise an enterprise resource planning system providing functionality to users of the buyer organization. Embodiments are not limited to one supplier system 120 or to one buyer system 130. Rather, it is expected that transaction network 110 provides functionality to many subscribing supplier and buyer organizations to facilitate transactions between all the organizations.

Storage system 140 stores transaction data 145 of all transactions managed by transaction network 110. Transaction data 145 may comprise multiple relational database tables as is known in the art. Storage system 140 may comprise one or more standalone or distributed databases, data warehouses, object stores, or any other storage systems that are or become known.

FIG. 1 illustrates components related to invoice submission and error detection. For example, it is assumed that a user of supplier system 120 desires to submit an invoice to buyer system 130 via transaction network 110. The user may operate supplier system 120 to generate the invoice in transaction network 110 using invoice generation component 112. In some embodiments, the user generates the invoice in supplier system 120 itself, without assistance from invoice generation component 112.

A submitted invoice is rejected by transaction network 110 if it does not conform to the rules of transaction network 110. Even if a submitted invoice conforms to the rules of transaction network 110, buyer system 130 may reject the invoice if it does not conform to the rules of buyer system 130. In some embodiments, an invoice is analyzed by error detection component 114 prior to formal submission. The analysis is intended to detect any errors which might cause transaction network 110 or buyer system 130 to reject the invoice. Invoice generation component 112 may submit the invoice to error detection component 114 if the invoice was generated by invoice generation component 112. For an invoice generated on supplier system 120, supplier system 120 may submit the invoice to error detection component 114 directly via an exposed endpoint according to some embodiments.

Error detection component 114 may receive invoice data and determine one or more rejection reasons based on the invoice data. In some embodiments, error detection supplier system 120 creates an invoice, generates feature data based on the invoice data and inputs the feature data directly to trained model 116. Trained model 116, which may be trained based on transaction data 145 as will be described below, outputs one or more rejection labels based on the input feature data and returns the one or more labels to error detection component 114.

Error detection component 114 determines a rejection reason corresponding to each of the one or more labels output by trained model 116. Error detection component 114 may return the determined rejection reasons to invoice generation component 112 for display to a user of supplier system 120. In some embodiments, error detection component 114 returns the determined rejection reasons directly to supplier system 120.

Although invoice generation component 112, error detection component 114 and trained model 116 are illustrated as separate components, a single one of components may provide the functionality attributed to two or more of components/model 112, 114 and 116. Moreover, more than two components may provide the functionality attributed to a single one of components/model 112, 114 and 116.

Figure 2:
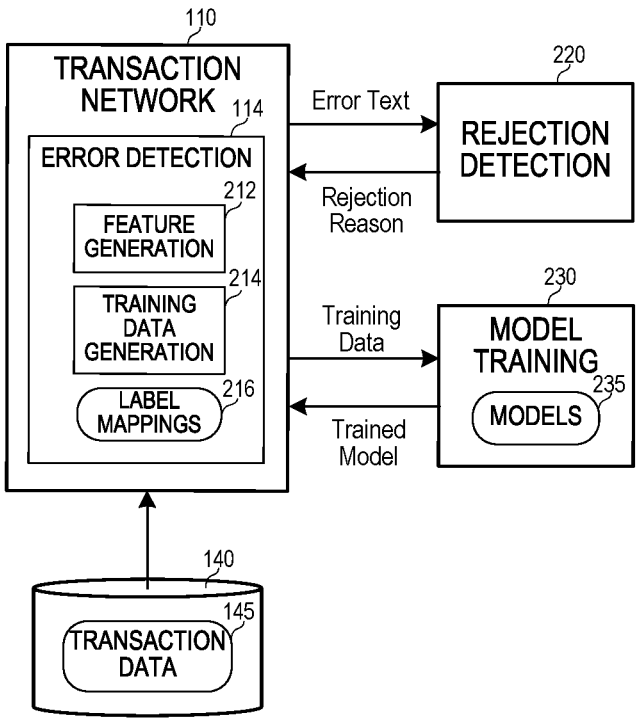
FIG. 2 is a block diagram illustrating generation of a model to predict invoice rejections based on received invoice data according to some embodiments.

FIG. 2 is a block diagram illustrating generation of a trained model to predict invoice rejections based on received invoice data according to some embodiments. Supplier and buyer systems are omitted from FIG. 2 for clarity. Error detection component 114 of network 110 has been expanded to illustrate sub-components which may be used to generate training data for training the model according to some embodiments.

Error detection component 114 acquires transaction data 145 associated with a large number of invoice submissions. The acquired transaction data 145 for a particular invoice submission may include, for example, data of the submitted invoice, a buyer organization to which the invoice was submitted, and details of any rejections resulting from the submission of the invoice. For each invoice submission which was rejected, error detection component 114 extracts text related to the rejections (i.e., "error text") from the transaction data 145 associated with the invoice. The error text is transmitted to rejection detection component 220.

Rejection detection component 220 determines one or more rejection reasons based on the error text and returns the rejection reason(s) to error detection component 114. In some embodiments, rejection detection component 220 also determines and returns an invoice field associated with each rejection reason (i.e., the invoice field whose data resulted in the rejection). As will be described in detail below, rejection detection component 220 may identify pre-defined string patterns (i.e., defined using regex patterns) within the error text using a natural language processor and determine a rejection reason corresponding to each identified pattern. In some embodiments, rejection detection component 220 includes a trained large language model which receives the error text and a prompt specifying a set of possible rejection reasons and returns one or more rejection reasons in response.

For each invoice submission, training data generation component 214 determines a rejection label associated with the returned rejection reasons. The determination may be based on label mappings 216, which map a numerical value to each of several rejection reasons. As a result, each rejected invoice submission represented by the acquired transaction data 145 is associated with one rejection label.

According to some embodiments, a rejection label may represent a combination of two or more rejection reasons. For example, the rejection label "1" may be associated with a first rejection reason, the rejection label "2" may be associated with a second rejection reason, and the rejection label "3" may be associated with the first rejection reason and with the second rejection reason. The use of such "multi-labels" may allow the association of each rejected invoice submission with a single rejection label, regardless of the number of rejection reasons determined for a given invoice submission.

Training data generation component 214 determines one or more instances of training data for each invoice submission of the acquired transaction data 145. Initially, feature generation component 212 determines a set of feature values for each invoice submission based on the associated transaction data 145. Training data generation component 214 then associates a rejection label with each set of feature values to generate the training data instances.

It will be assumed that the label associated with successful invoice submissions is "0". Accordingly, if an underlying invoice submission was successful, training data generation component 214 generates a training data instance consisting of the set of feature values determined for the invoice submission and the label "0". If the underlying invoice submission was rejected, training data generation component 214 generates a training data instance including a rejection label associated with the invoice submission.

The generated training data is provided to model training component 230. Model training component 230 uses the training data to train a classification model 235 to output a label based on an input set of feature values. Classification model 235 may comprise any known suitable model architecture, including but not limited to a decision tree and a Bernoulli naïve Bayes algorithm. In the case of a decision tree, the supplier ID may be used as a categorical feature because rejection reasons can vary from supplier to supplier. Although depicted as separate components, transaction network 110 may implement either or both of rejection detection component 220 and model training component 230.

Model training component 230 provides the trained model to transaction network 110. The trained model may be provided in the form of a set of linear equations, executable program code, a set of hyperparameters defining the structure of the model and a set of corresponding node weights, or any other representation of the mapping of the input features to the labels which was learned as a result of the training. Transaction network 110 may use the trained model to analyze invoices as described with respect to FIG. 1.

Figure 3:
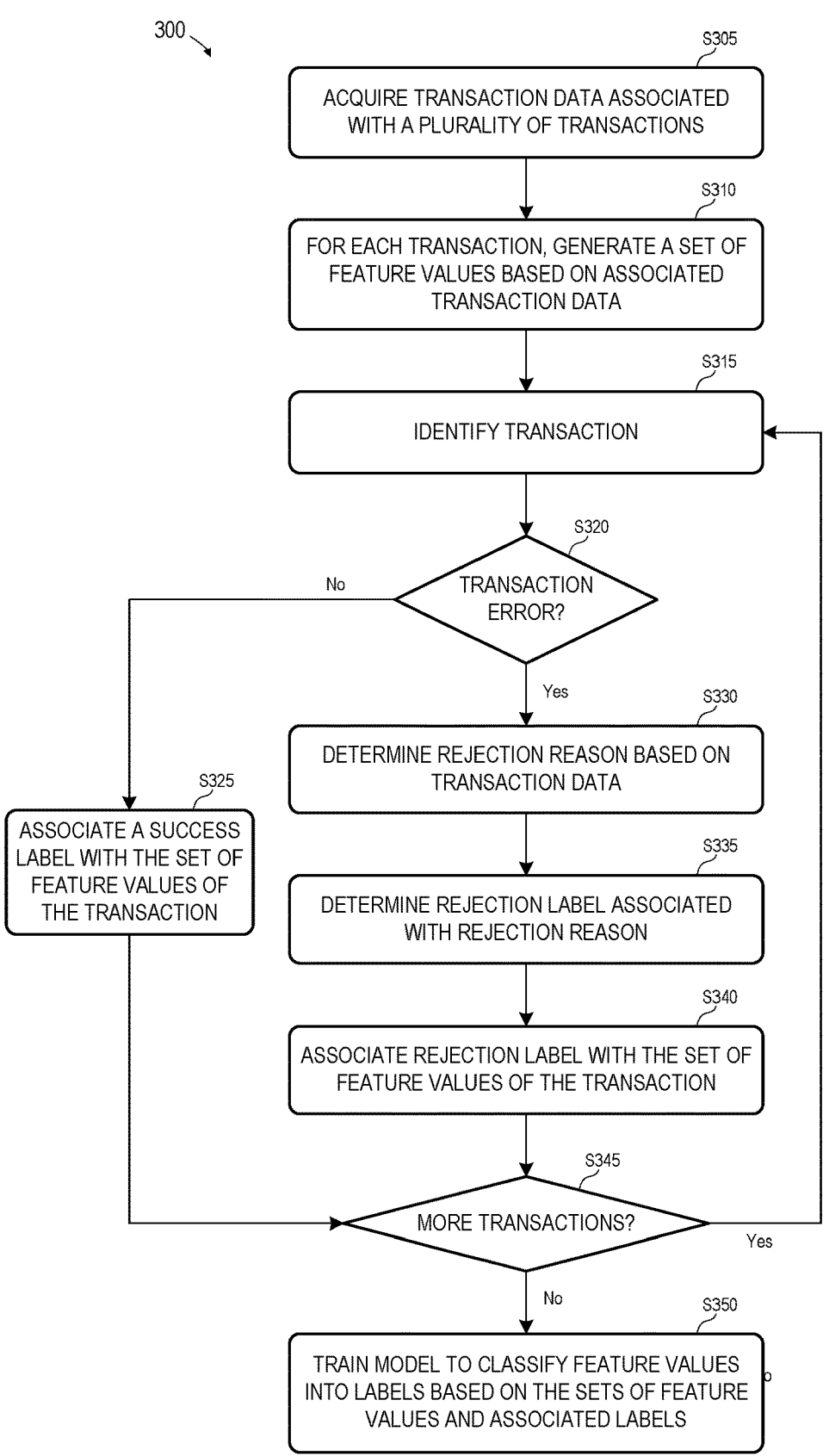
FIG. 3 is a flow diagram of a process to generate a model to predict invoice rejections based on received invoice data according to some embodiments.

FIG. 3 comprises a flow diagram of process 300 to generate a model to predict invoice rejections based on received invoice data according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

Initially, at S305, transaction data associated with a plurality of transactions is acquired. In the present example, the transactions of interest are historical invoice submissions. The transaction data for historical invoice submissions may be stored in a transaction network repository which also stores transaction data of other types of historical transactions. The acquired transaction data for a particular invoice submission may include header data (e.g., an invoice number, buyer and supplier addresses), line item data (e.g., materials and associated quantities and prices), attachment information, and details of any rejections resulting from the submission of the invoice.

FIG. 4 is a tabular representation of transaction data 400 associated with each of a plurality of transactions according to some embodiments. Transaction data 400 may be acquired at S305. Each row of transaction data 400 may be associated with a respective distinct invoice submission, and each column represents an attribute, where a cell of a particular row and column includes a value of the attribute represented by the particular column for the invoice submission associated with the particular row. Embodiments are not limited to the particular attributes of transaction data 400.

At S310, a set of feature values is generated for each transaction. The set of feature values generated for a transaction is generated based on transaction data associated with the transaction. For example, transaction data of a given row of transaction data 400 is used to generate a set of feature values for the invoice submission associated with the given row. Generation of the set of feature values may be based on any feature engineering techniques that are or become known, including removing less relevant attributes from transaction data 400, combining values of two or more attributes of transaction data 400 into one feature value, converting attribute values to numerical form, etc.

According to some embodiments, the features of each set of feature values include: Payload_ID; Attachment_Name; PO_Line_Desc; Timesheet_Approval; Timesheet_Attachment; Network_Approval_Attachment; Invoice_Attachment; Timesheet_Needed; Document_Status; From_Org; To_Org; and Argument. Examples of corresponding feature values of these features may include, respectively: 1675676-2343; Invoice_11.pdf; Maintenance; 1; 0; 0; 0; 1; 0; cancelled; 1235243; 1534332; and Customer reference 930131.

FIG. 5 is a tabular representation of sets of feature values 500 generated based on transaction data associated with each of a plurality of transactions according to some embodiments. Each row of sets 500 includes a set of feature values which was generated based on the transaction data of a same row of transaction data 400. Each row of sets 500 is therefore associated with a row of transaction data 400 and with the invoice submission associated with the same row of transaction data 400. Embodiments are not limited to the particular features of feature values 500.

One of the transactions associated with the acquired transaction data is identified at S315. The transaction data associated with the transaction is reviewed at S320 to determine whether the transaction is associated with an error. According to the present example, the transaction identified at S315 is an invoice submission and S320 may comprise determining based on the associated transaction data whether the identified invoice submission was rejected.

At S325, if the transaction is not associated with an error (e.g., the invoice submission was successful), a success label is associated with the set of feature values which were generated at S310 from the transaction data associated with the transaction. The set of feature values and the associated success label (e.g., "0") may be considered one instance of training data, with the label being the "ground truth" of the instance. Flow proceeds to S345 from S325. Flow returns from S345 to S315 if the acquired transaction data includes data of additional transactions.

Continuing the present example, another transaction is identified at S315. It will be assumed that the transaction is associated with an error, causing flow to proceed from S320 to S330. At S330, one or more rejection reasons are determined based on the transaction data associated with the transaction. In some embodiments, the rejection reasons are determined based on error text within the transaction data.

Figure 6:
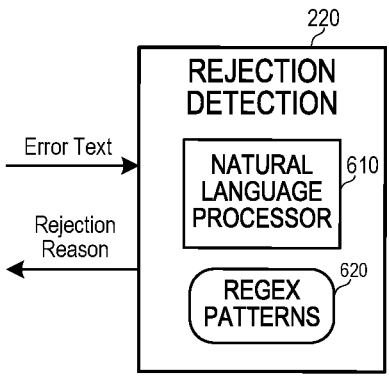
FIG. 6 is a block diagram illustrating rejection detection according to some embodiments.

FIG. 6 illustrates an embodiment of rejection detection component 220. Rejection detection component 220 of FIG. 6 includes natural language processor 610 and regex patterns 620 as is known in the art. In some embodiments of S330, rejection detection component 220 receives the error text from the transaction data. Natural language processor 610 parses the error text based on regex patterns 620 to identify string patterns within the error text. Rejection detection component 220 determines a rejection reason associated with each identified string pattern, for example based on mappings specified in regex patterns 620. Since more than one string patterns may be identified within the error text, rejection detection component 220 of FIG. 6 may determine one or more rejection reasons based on the received error text.

Figure 7:
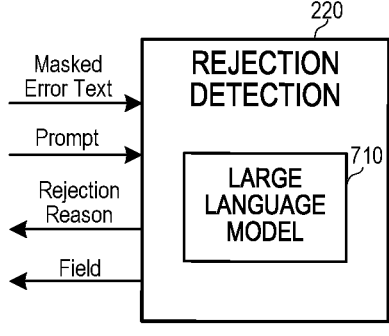
FIG. 7 is a block diagram illustrating rejection detection according to some embodiments.

FIG. 7 illustrates another embodiment of rejection detection component 220 for use at S330. Rejection detection component 220 of FIG. 7 includes trained large language model 710 as is currently or hereafter known. Rejection detection component 220 may therefore be provided by a third-party service. Accordingly, for privacy reasons, S330 may include masking the error text of the transaction data to anonymize the error text (e.g., by removing customer numbers, e-mail addresses, telephone numbers and mailing addresses) prior to sending the error text to rejection detection component 220. An example of masked error text of transaction data according to an embodiment may be as follows:

"Customer internal reference number [reference number]—The invoice cannot be processed for the reason mentioned in the comments section—Comments: Invoice returned to vendor—Comments: Invoice number does not match with tax invoice and network invoice—Submit the invoice with correct data—For any issues, please reach out to [e-mail address]—Return Reasons: 10 Mismatch—Network and ERP invoice."

As shown, rejection detection component 220 receives a prompt in conjunction with the error text. The prompt defines a task to be performed by large language model 710 and may also specify constraints on the task. In some embodiments of S330, the prompt is as follows: "Extract the content from the error text below in a JSON format. Valid keys for JSON are Customer internal reference number, Return reason, Invoice field, Rejection reason detail. Invoice field can include the following values: Invoice number, Timesheet attachment, Timesheet approval attachment, Invoice Date, GRN field, GRN reference, Bill to address, Field not found, SEZ declaration, Attachment field". Embodiments may use any suitable prompts, JSON keys and/or invoice fields.

In response to the prompt, rejection detection component 220 of FIG. 7 returns one or more rejection reasons and an invoice field for each rejection reason. The returned invoice field may indicate the field whose data caused the rejection. Continuing the above example, the information returned by rejection detection component 220 of FIG. 7 at S330 may include: "Return reason: 10 Mismatch Network and ERP Invoice"; "Invoice field: Invoice number".

Next, at S335, a rejection label associated with the returned rejection reasons is determined. The determination may be based on pre-defined label mappings which map a numerical value to each possible rejection reason and/or to each possible combination of rejection reasons. In some embodiments, it is possible that no rejection reason could be determined at S330 based on the error text, or that no label mapping exists for a particular determined rejection reason. In either case, no rejection label mapping can be automatically determined at S335. Accordingly, either the transaction is ignored and flow proceeds directly to S345, or an operator associates a rejection reason and/or a rejection label with the transaction at S335.

The rejection label determined at S335 is associated with the set of feature values generated for the transaction at S340. S340 includes generation of a training data instance including the rejection label determined at S335.

Flow then proceeds to S345 and continues as described above until all transactions of the acquired transaction data have been processed. At this point, training data consisting of many training data instances has been generated. Each training data instance is associated with one transaction and includes a set of feature values based on the transaction data of the transaction and a label (i.e., a success label or one of several possible rejection labels).

Figure 8:
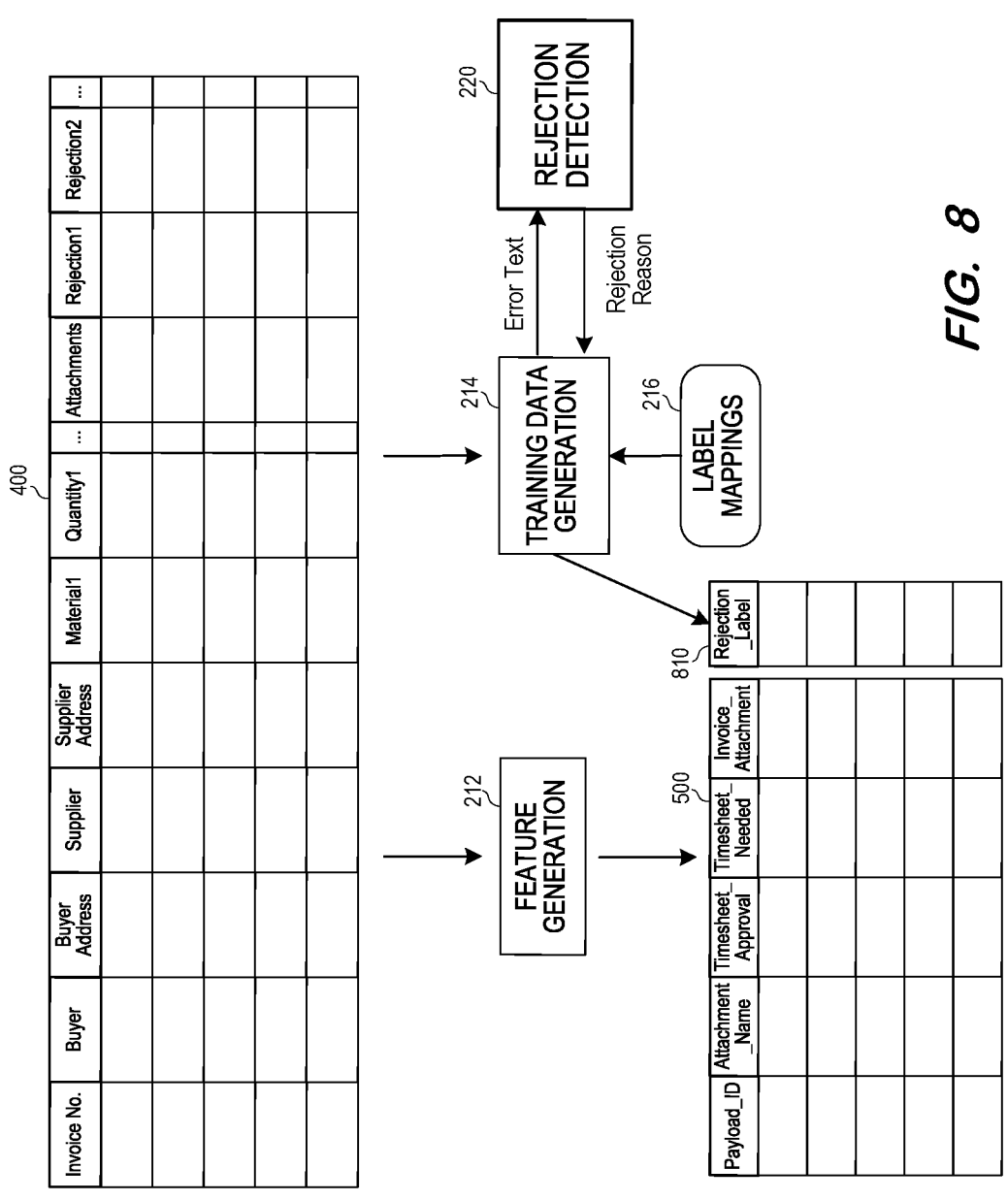
FIG. 8 is a block diagram illustrating generation of training data from transaction data according to some embodiments.

To further clarify the operation of some embodiments, FIG. 8 is a block diagram illustrating generation of training data from transaction data according to some embodiments. As shown, feature generation component 212 generates a set of feature values (i.e., each row of feature values 500) for each respective row of transaction data 400. Training data generation component 214 provides the error text of transaction data 400 associated with each failed transaction (e.g., rejected invoice) to rejection detection component 220.

Based on the error text, rejection detection component 220 determines one or more rejection reasons for each failed transaction. In the present example, it will be assumed that rejection detection component 220 determines one rejection reason for each failed transaction. Training data generation component 214 therefore determines a single label 810 for each failed transaction based on its rejection reason and on label mappings 216. Training data generation component 214 also determines a label 810 for each successful transaction represented by transaction data 400. Training data generation component 214 then associates the label 810 determined for each transaction represented by transaction data 400 with a set of feature values 500 which is associated with the transaction. Feature values 500 and labels 810 comprise the training data which will be used at S350.

According to some embodiments, the training data may include many more instances representing successful transactions than instances representing any one particular rejection reason. The instances representing failed transactions may therefore be oversampled (e.g., duplicated) as is known in the art to achieve a more uniform balance of instances associated with different respective labels.

Figure 9:
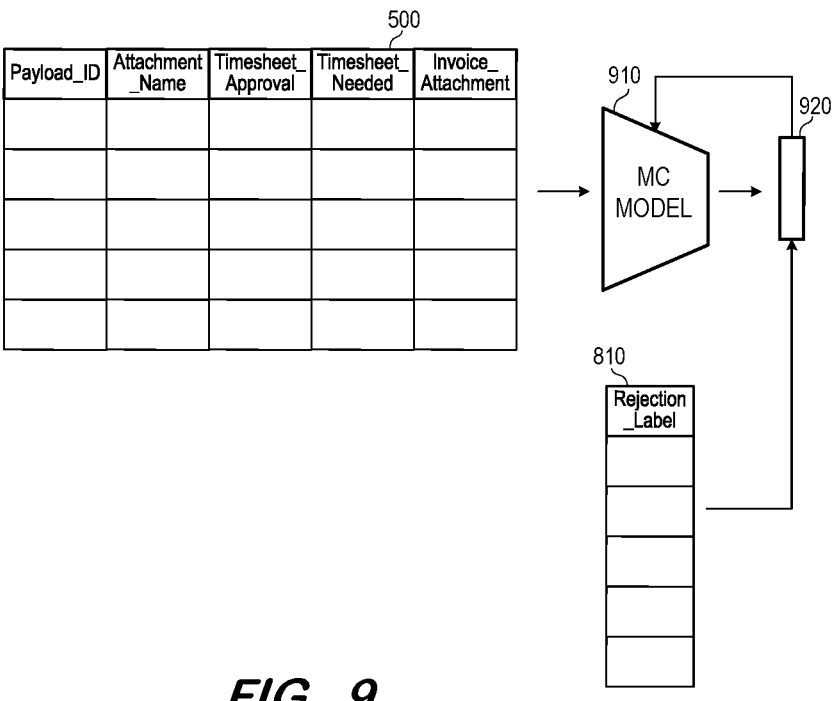
FIG. 9 is a block diagram illustrating training a multi-class classifier based on training data according to some embodiments.

At S350, the training data is used to train a model to output a label based on an input set of feature values. FIG. 9 is a block diagram illustrating training multi-classification model 910 based on training data consisting of sets of feature values 500 and associated labels 810. Classifier/ model 910 may comprise any type of iterative learning-compatible network, algorithm, decision tree, etc., that is or becomes known. Model 910 may comprise a network of neurons which receive input, change internal state according to that input, and produce output depending on the input and internal state. The output of certain neurons is connected to the input of other neurons to form a directed and weighted graph. The weights as well as the functions that compute the internal states are modified during training using supervised learning algorithms as is known.

Training at S350 may comprise execution of training iterations. One iteration according to some embodiments may include inputting a subset (i.e., a batch) of instances of feature values 500 to model 910, operating model 910 to output corresponding labels, operating loss layer 920 to evaluate a loss function based on the output labels and corresponding ground truth labels 810, and modifying model 910 based on the evaluation. Iterations continue in this manner until the performance of model 910 is determined to be satisfactory.

FIG. 10 illustrates interface 1000 to generate an invoice according to some embodiments. In one example, a supplier system such as system 120 accesses a transaction network such as network 110 to generate an invoice therein. The network provides functionality to present an interface such as interface 1000 via which a supplier may generate an invoice for transmission to a buyer system which is also in communication with (e.g., subscribed to) the network. According to some embodiments, interface 1000 is presented by a device executing a client application (e.g., a Web application) which communicates with an invoice generation service provided by the network.

Interface 1000 includes area 1010 for inputting Summary data of an invoice header. Embodiments are not limited to the input fields of area 1010. Similarly, area 1020 includes fields for inputting Shipping information to be included in the invoice. As is known in the art, interface 1000 may include additional input areas for specifying items and corresponding quantities and prices.

Interface 1000 also includes Error Detection control 1030. Upon user selection of control 1030, data associated with the displayed invoice is input to a trained model as described above with respect to FIG. 1. The data may comprise a set of feature values which correspond to the feature values used to train the model. Selection of control 1030 may therefore initiate generation of a set of feature values based on the data of the displayed invoice for input to the trained model.

The trained model outputs one or more labels based on the input set of features. For example, the trained model may output a probability for each possible label, and those labels associated with a probability greater than a threshold are considered valid. Next, the valid labels are mapped to rejection reasons in a reversal of the process described above with respect to S335.

FIG. 11 illustrates presentation of the thusly-determined rejection reasons by interface 1000 according to some embodiments. Area 1110 includes text specifying possible rejections which may be triggered upon submission of the subject invoice. In the illustrated example, two labels output by the trained model are deemed valid, resulting in the presentation of two rejection reasons in area 1110.

Area 1120 includes messages (beginning with "Please ensure") describing two potential errors. According to some embodiments, these errors are non-deterministic errors which the trained model is unable to determine. Instead, these errors are determined based on the prevalence of various rejections within historical transaction data associated with the particular buyer to which the invoice is to be submitted. For example, in the case of buyer "ACME Testing" of the displayed invoice, it is noted from historical transaction data that the most prevalent reasons for rejection are a mismatch between dates of a Network invoice and a Tax invoice, and the lack of a selected endorsement clause in the case of a Network invoices billed to SEZ and not including taxes.

Based on the information presented in areas 1110 and 1120, the supplier may review and correct the invoice prior to submission to the buyer. Embodiments may therefore efficiently reduce the number of invoice rejections, thereby conserving resources and improving cash flow.

Figure 12:
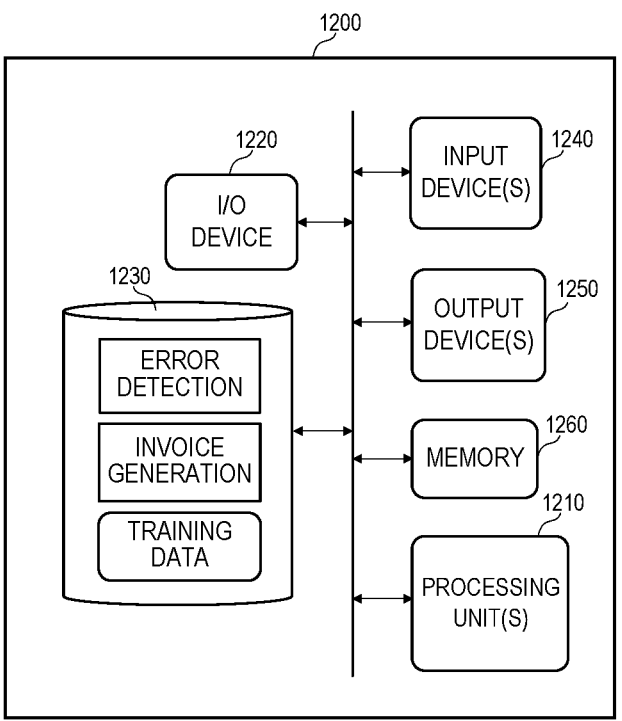
FIG. 12 is a block diagram of a hardware system for providing invoice rejection predictions according to some embodiments.

FIG. 12 illustrates system 1200 to provide invoice rejection predictions according to some embodiments. System 1200 may comprise a general-purpose computing apparatus and may execute program code to perform any of the functions described herein. System 1200 may be implemented by a distributed cloud-based server in some embodiments. System 1200 may include other unshown elements according to some embodiments.

System 1200 includes processing unit(s) 1210 operatively coupled to I/O device 1220, data storage device 1230, one or more input devices 1240, one or more output devices 1250 and memory 1260. I/O device 1220 may facilitate communication with external devices, such as an external network, the cloud, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into hardware system 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, and RAM devices, while memory 1260 may comprise a RAM device.

Data storage device 1230 stores program code executed by processing unit(s) 1210 to cause system 1200 to implement any of the components and execute any one or more of the processes described herein. Embodiments are not limited to execution of these processes by a single computing device. Data storage device 1230 may also store data and other program code for providing additional functionality and/or which are necessary for operation of hardware system 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   at least one processing unit to execute the processor-executable program code to cause the system to:
   acquire operation data associated with a plurality of operations;
   for each of the plurality of operations, generate a set of feature values based on associated operation data;
   determine a first set of the plurality of operations associated with an error; and
   for each operation of the first set of the plurality of operations:
   automatically determine a rejection reason based on the operation data associated with the operation, the operation data comprising error text indicating why a particular distinct document was rejected;

parse the error text to identify one or more pre-defined string patterns in the error text and determine a rejection label associated with the rejection reason based on the identification of the one or more pre-defined string patterns;

associate the rejection label with the set of feature values generated for the operation; and train a model to output a label based on the sets of feature values generated for each operation of the first set of the plurality of operations and associated rejection labels;

receive invoice data;

generate a first set of feature values based on the invoice data;

input the first set of feature values to the trained model;

receive a label from the trained model; and present a message associated with the received label to a user on a display screen, the message indicating one or more reasons for rejecting an invoice comprising the invoice data.

2. A system according to claim 1, the at least one processing unit to execute the processor-executable program code to cause the system to:

determine a second set of the plurality of operations which are not associated with an error; and associate a success label with the set of feature values generated for each of the second set of the plurality of operations.

3. A system according to claim 2, wherein training of the model comprises:

training of the model to output a label based on the sets of feature values generated for each operation of the first set of the plurality of operations and associated rejection labels, and on the sets of feature values generated for each operation of the second set of the plurality of operations and associated success labels.

4. A system according to claim 1, wherein automatic determination of a rejection reason based on operation data associated with an operation comprises:

identification of error text in the operation data;

identification of a regular expression in the error text based on a pre-defined string pattern using a natural language processor; and determination of a rejection reason corresponding to the pre-defined string pattern.

5. A system according to claim 1, wherein automatic determination of a rejection reason based on operation data associated with an operation comprises:

identification of error text in the operation data;

submission of the error text to a trained large language model with a prompt specifying a set of possible rejection reasons; and in response to the error text and the prompt, receipt of the rejection reason from the trained large language model.

6. A method comprising:

acquiring operation data associated with a plurality of invoice submissions;

for each of the plurality of invoice submissions, generating a set of feature values based on associated operation data;

determining a first set of the plurality of invoice submissions associated with an error;

for each operation of the first set of the plurality of invoice submissions:

automatically determining a rejection reason based on the operation data associated with the invoice submissions, the operation data comprising error text indicating why a particular invoice submission of the plurality of invoice submissions was rejected;

parsing the error text to identify one or more pre-defined string patterns in the error text and determining a rejection label associated with the rejection reason based on the identification of the one or more pre-defined string patterns;

associating the rejection label with the set of feature values generated for the invoice submissions;

training a model to output a label based on the sets of feature values generated for each operation of the first set of the plurality of operations and associated rejection labels;

receiving invoice data;

generating a first set of feature values based on the invoice data;

inputting the first set of feature values to the trained model;

receiving a label from the trained model; and presenting a message associated with the received label to a user on a display screen, the message indicating one or more reasons for rejecting an invoice comprising the invoice data.

7. A method according to claim 6, further comprising:

determining a second set of the plurality of operations which are not associated with an error; and associating a success label with the set of feature values generated for each of the second set of the plurality of operations.

8. A method according to claim 7, wherein training the model comprises:

training the model to output a label based on the sets of feature values generated for each operation of the first set of the plurality of operations and associated rejection labels, and on the sets of feature values generated for each operation of the second set of the plurality of operations and associated success labels.

9. A method according to claim 6, wherein automatically determining a rejection reason based on operation data associated with an operation comprises:

identifying error text in the operation data;

submitting the error text to a trained large language model with a prompt specifying a set of possible rejection reasons; and in response to the error text and the prompt, receiving the rejection reason from the trained large language model.

10. A method according to claim 6, further comprising:

receiving invoice data;

generating a first set of feature values based on the invoice data;

inputting the first set of feature values to the trained model;

receiving a label from the trained model; and presenting a message associated with the received label.

11. A non-transitory medium storing program code executable by at least one processing unit of a computing system to cause the computing system to:

acquire operation data associated with a plurality of operations;

for each of the plurality of operations, generate a set of feature values based on associated operation data;

for each of the plurality of operations:

automatically determine a rejection reason based on the operation data associated with the operation, the operation data comprising error text indicating why a particular distinct document was rejected;

parse the error text to identify one or more pre-defined string patterns in the error text and determine a rejection label associated with the rejection reason based on the identification of the one or more pre-defined string patterns;

associate the rejection label with the set of feature values generated for the operation;

train a model to output a label based on the sets of feature values generated for each operation of the plurality of operations and associated rejection labels;

receive invoice data;

generate a first set of feature values based on the invoice data;

input the first set of feature values to the trained model;

receive a label from the trained model; and present a message associated with the received label to a user on a display screen, the message indicating one or more reasons for rejecting an invoice comprising the invoice data.

12. A medium according to claim 11, the program code executable by at least one processing unit of a computing system to cause the computing system to:

acquire operation data associated with a second plurality of operations;

for each of the second plurality of operations, generate a second set of feature values based on associated operation data; and associate a success label with the second set of feature values generated for each of the second plurality of operations.

13. A medium according to claim 12, wherein training of the model comprises:

training of the model to output a label based on the sets of feature values generated for each operation of the plurality of operations and associated rejection labels, and on the second sets of feature values generated for each operation of the second plurality of operations and associated success labels.

14. A medium according to claim 11, wherein automatic determination of a rejection reason based on operation data associated with an operation comprises:

identification of error text in the operation data;

submission of the error text to a trained large language model with a prompt specifying a set of possible rejection reasons; and in response to the error text and the prompt, receipt of the rejection reason from the trained large language model.

15. A medium according to claim 11, the program code executable by at least one processing unit of a computing system to cause the computing system to:

receive invoice data;

generate a first set of feature values based on the invoice data;

input the first set of feature values to the trained model;

receive a label from the trained model; and present a message associated with the received label.

\* \* \* \* \*